Figure 1:
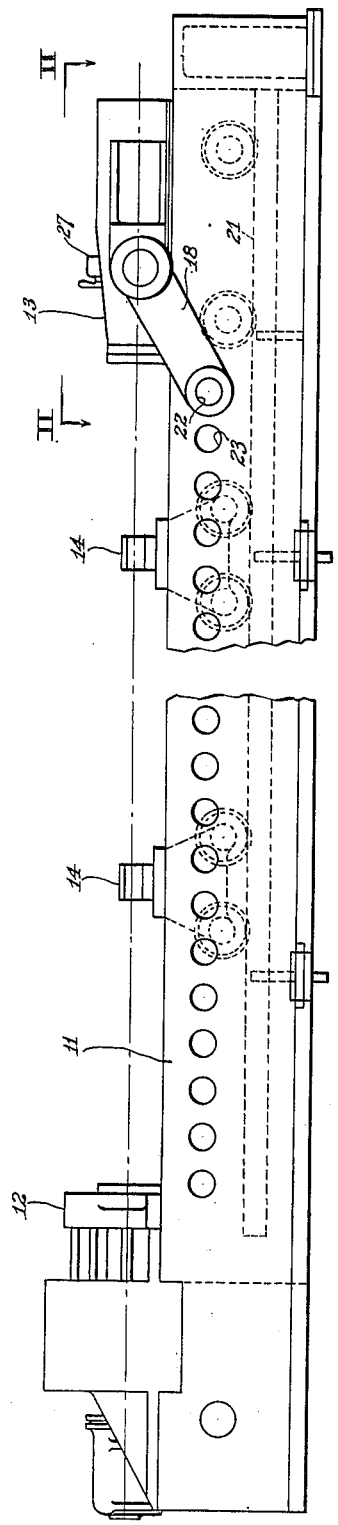

Nov. 11, 1952        H. E. GRAU        2,617,291

TUBE TESTING APPARATUS

Filed Oct. 25, 1947        3 Sheets-Sheet 1

INVENTOR.
HERMAN E. GRAU.
BY J. E. Deckman
His Atty

Nov. 11, 1952  H. E. GRAU  2,617,291
TUBE TESTING APPARATUS
Filed Oct. 25, 1947   3 Sheets-Sheet 2
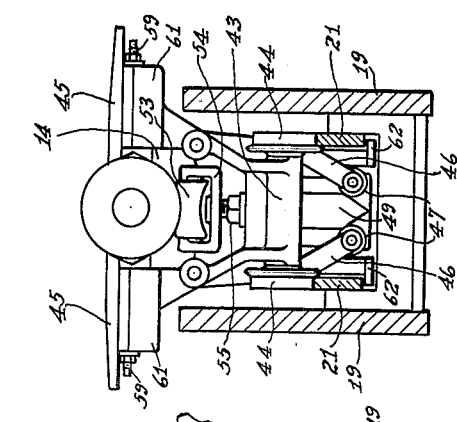
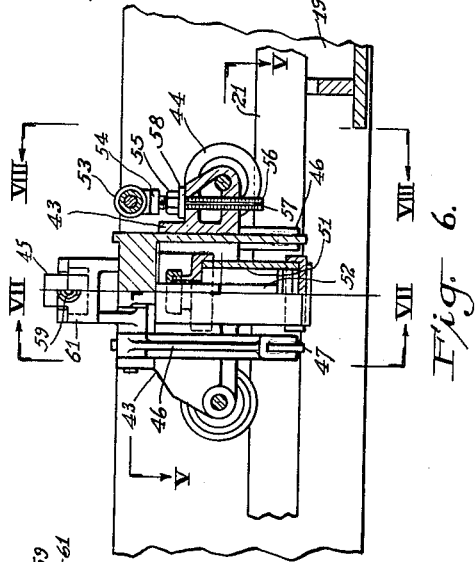
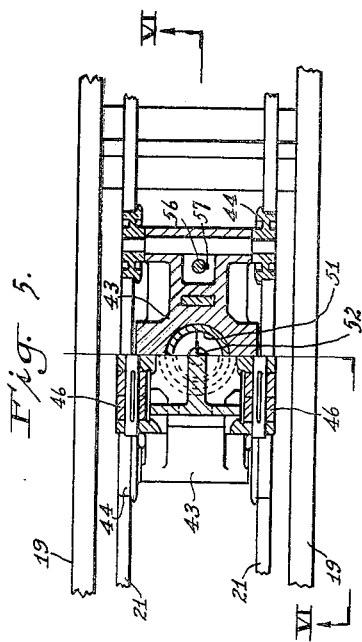
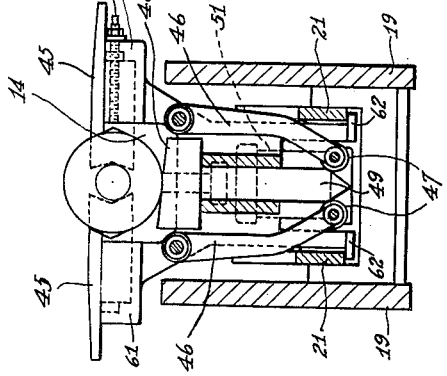
INVENTOR
HERMAN E. GRAU.
BY J. E. Dickinson
ATTORNEY Nov. 11, 1952 H. E. GRAU 2,617,291
TUBE TESTING APPARATUS
Filed Oct. 25, 1947 3 Sheets-Sheet 3
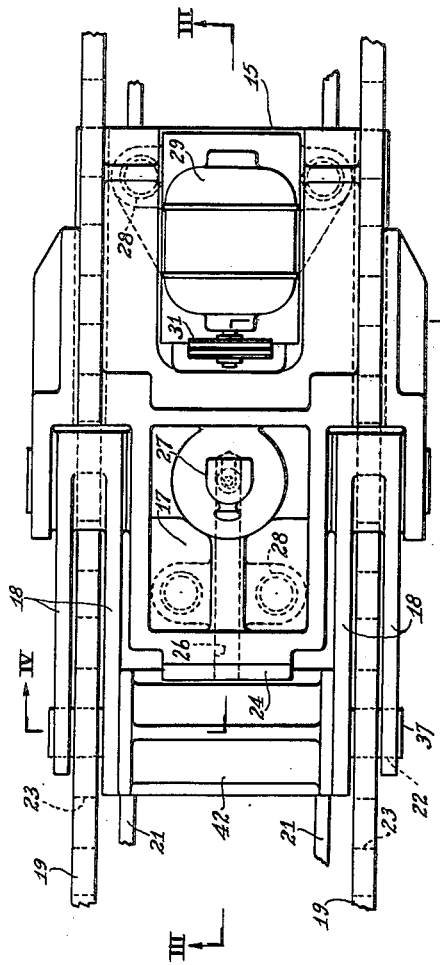
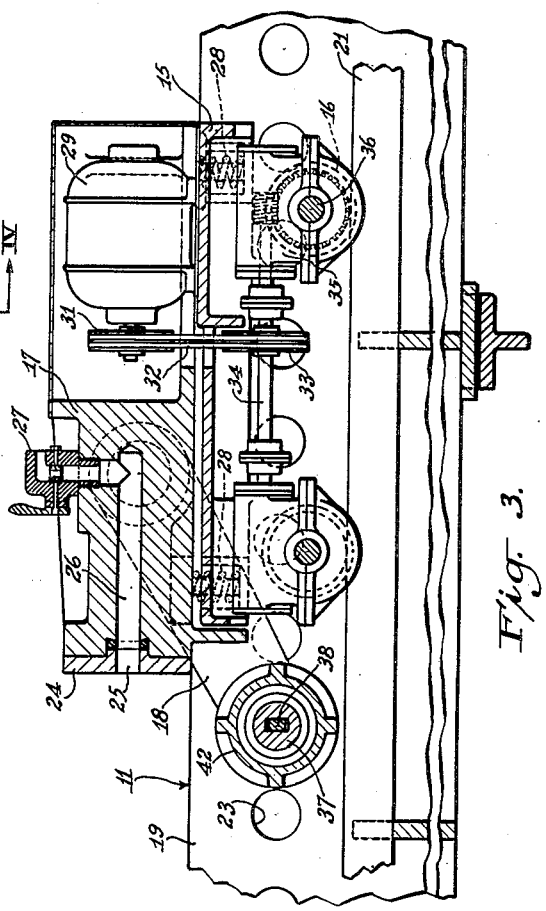
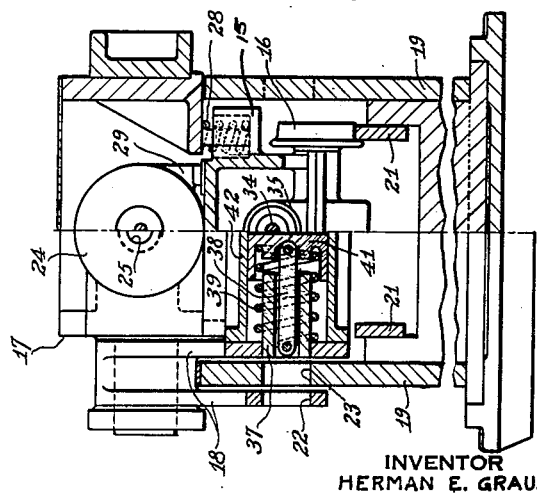
INVENTOR
HERMAN E. GRAU.
BY
ATTORNEY Patented Nov. 11, 1952

2,617,291

UNITED STATES PATENT OFFICE 2,617,291

TUBE TESTING APPARATUS

Herman E. Grau, Mount Lebanon, Pa., assignor to United Engineering & Foundry Company, Pittsburgh, Pa., a corporation of Pennsylvania Application October 25, 1947, Serial No. 782,084

4 Claims. (Cl. 73—37)

This invention relates to an improvement in testing apparatus and in particular to apparatus adapted to be used for testing, under hydraulic pressure, tubes of various lengths and diameters, the term "tubes" as employed herein being used in the generic sense to include pipes as well as all other elongated hollow objects of a like construction.

Although many types of hydraulic tube testing apparatus have been proposed for use in the past, defects have been present therein such as the difficulty of placing the tubes in position between the two supporting heads and of ejecting them therefrom on completion of the test, inaccessibility of the tubes for ready inspection when being tested, and extremely great forces, caused by the test pressures involved, imposed upon the tail stock carrying members which are usually in the form of rollers or wheels mounted on the tail stock assembly. While the forces taken by the carriage rollers or wheels may be relatively small in those cases where tubes undergoing test do not require a total hydraulic pressure of any great magnitude, the thrust forces become very appreciable during the testing of large diameter tubes so that the bearings and axles supporting the rollers or wheels must be of considerable size to withstand the forces imposed thereon.

The apparatus disclosed herein eliminates the aforementioned difficulties by providing automatic positioning and ejecting elements which maintain the tube at such an elevation as to be accessible for ready inspection during the test. An adjustable tail stock, mounted on a carriage for moving it longitudinally along the frame to the desired position, is adapted to transfer the loads, incident to the thrust caused by the testing pressure, directly to the frame of the apparatus rather than through the wheel assembly of the carriage to the frame, thus affording a more rigid support.

It is one object of this invention to provide tube testing apparatus adapted to receive and clamp in position a tube to be tested thereby and to eject the tube readily therefrom on the completion of the test thereof.

It is another object of this invention to provide tube testing apparatus having a tail stock which can be shifted readily, in a longitudinal direction, for accommodating different lengths of pipes and which is so constructed that forces incident to the testing of tubes will be transmitted directly from the tail stock body to the main supporting frame.

Still another object of this invention is to provide tube testing apparatus which is relatively simple to operate, rugged and economical of construction, and for which the cost of maintenance is relatively low.

These objects, as well as the various other novel features and advantages of this invention, will become apparent from the following description and accompanying drawings of which:

Figure 1 is a side elevation view of a hydraulic tube tester in which certain features of my invention are embodied, Figure 2 is a plan view of the tail stock assembly taken at II—II of Figure 1, Figure 3 is a sectional view taken on III—III of Figure 2, Figure 4 is a sectional elevation view taken at IV—IV of Figure 2 showing the tail stock and carriage assembly mounted on but disengaged from the frame of the tester, Figure 5 is a plan view of one of the adjustable tube supports taken at V—V of Figure 6, Figure 6 is a side elevation view, partly in section, taken on VI—VI of Figure 5, Figure 7 is an end elevation view, partly in section, taken on VII—VII of Figure 6, and Figure 8 is an end elevation view, taken on VIII—VIII of Figure 6.

With reference to Figure 1, the tube tester with which the improved adjustable tail stock and tube clamping devices are associated, as disclosed herein, comprises a longitudinally extending frame 11, head stock 12, with suitable hydraulic connections embodied therein but not specifically described or shown as they form no part of this invention, adjustable tail stock 13 and adjustable tube clamping devices 14 spaced along frame 11.

The adjustable tail stock assembly, illustrated in detail in Figures 2 through 4, comprises a carriage 15, having a plurality of flanged wheels 16 secured thereto, which together with a tail stock body 17 mounted thereon and to which are pivotally connected a pair of clevised links 18 extending downward from carriage 15 and spanning the side rails 19 of frame 11, ride along a pair of tracks 21 positioned between the side rails 19 of the frame 11. Transverse openings 22 extending through the links 18 at the free end thereof are adapted to be aligned with similar side rail openings 23 which define a plurality of testing stations along the frame. A sealing head 24, affixed to the tail stock body 17, is provided with a central opening 25 therethrough which communicates with a passage 26 terminating in a purge valve 27 secured to the tail stock body 17. A plurality of springs 28, mounted on the carriage 15, yieldably support the tail stock body 17 in such a position that the bottom thereof just clears the top surface of the side rails 19. The carriage is adjusted longitudinally along the tracks 21 by means of an electrical motor 29, secured to the carriage, having a pulley 31 keyed to the shaft thereof and over which belts 32 pass to a second pulley 33 of shaft 34, the ends of which shaft terminate in gear boxes 35, through which shafts 36, supporting flanged wheels 16, extend and are connected in driving relationship with shaft 34.

Carriage 15 can be locked into any one of a number of pre-selected positions along frame 11, depending upon the length of tubing to be tested, by means of a pair of pins 37 extended through aligned openings 22 and 23 by actuation of piston 41 confined within cylinder 42 connected to a source of hydraulic power not shown. As shown in Figure 4 each of the pins 37 is provided with a link 38 passing therethrough attached at one end to the pin and at the other to piston 41, and with an encircling compression spring 39 which insures the return of the pin to its retracted position when the piston 41 is inactive. It is to be observed, however, that the pin 37 is withdrawn only from the openings of both the outer portion of the clevis and of the tube testing frame but always extends through the opening of the inner portion of the clevis, thus pivotally connecting together the tail stock body and the carriage.

Each of the tube clamping devices 14, adapted to be positioned along the frame 11 at spaced intervals in order adequately to support a tube resting thereon in the test position, comprises a carriage 43, supported on flanged wheels 44 which ride along track 21, having pivotally secured thereto a pair of transversely spaced clamping jaws 45 with downwardly extending arms 46 to the ends of which are rotatably secured rollers 47. A tube ejecting inclined platform 48, to the ends of which are secured downwardly extending wedges 49 adapted to engage with the rollers 47 for spreading apart the arms 46 to cause the two jaws 45 to come into clamping relationship, as shown in Figure 7, is supported on and movable vertically by a hydraulic motor 51, also mounted on carriage 43, having a piston 52, the rod thereof engaging with the bottom side of platform 48. Since the center of gravity of jaws 45 is outward of the pivot point of the arms 46, the jaws are automatically thrown open when the wedges 49 are raised and disengaged from rollers 47. A roller 53 is rotatably supported on bracket 54 and vertically adjustable by means of nut 55, which bracket is secured to the end of a threaded shaft 56 having a slot 57 extending along its length to prevent the turning thereof within an opening in the crossmember 58 through which it passes for slidable movement therein. Depending upon the size of tubing to be accommodated, each of the jaws 45 is transversely adjustable by means of threaded shaft 59, the inner end of which is rotatably secured to the jaw 45 and the other end extending through and outside the support 61 within which the jaw is slidably secured. Any diameter tube from the maximum to the minimum size, which can be accommodated by the tube tester with which the improved clamp disclosed herein is employed, can be readily handled since the rollers 53 can be adjusted to any desired vertical position to insure that the axis of the tube will be in line with the sealing members of the head and tail stock assembly. By virtue of the weight of the inclined platform 48 and the wedges 49 supported thereby, the force incident to gravity when the hydraulic pressure within the hydraulic motor 51 is released, will be sufficient to cause the wedges to engage with and spread apart the rollers 47 to cause the jaws 45 to move toward each other for clamping a tube therebetween. In order to prevent carriage 43 from accidentally leaving the tracks 21, the frame of the carriage extends downward adjacent to the tracks to prevent side motion of the carriage, and is provided with pads 62 secured at the bottom thereof which extend beneath and in slidable contact with the underside of the tracks to oppose any tendency of the carriage to tilt upward.

The preferred embodiment of my invention having been described in detail, operation thereof may be briefly summarized as follows:

Depending upon the length and diameter of tubes of a given batch to be tested, tube clamping devices 14 are spaced along frame 11 at desired intervals, rollers 53 adjusted vertically so that the axis of a tube to be supported thereby will coincide with the axis of the testing apparatus, the clamping jaws 45 spread apart by applying pressure to the hydraulic motor 51 so that wedges 49 become disengaged from rollers 47, and carriage 15, supporting tail stock body 17, shifted along frame 11 and locked in position by extending pins 37 through one of the pairs of openings 23 in the side rails 19 defining the proper station for the tube being tested. A tube is placed upon the rollers 53 of the clamping devices 14, the tube sealed in position between the head and tail stocks by means of a sealing plunger or the like, not shown or described herein as it forms no part of this invention, which is extended from the head stock to engage one end of the tube to force the opposite end against the sealing member 24 of the tail stock body, and the clamping jaws 45 engaged with the tube by cutting off the pressure within the motor 51 to permit the wedges 49 to drop downward for engagement with the rollers 47 to spread apart the arms 46. The purge valve 27 is opened to the atmosphere, testing fluid admitted from the head stock to fill the tube, and after the air is expelled from the tube and valve 27 closed, the test pressure is applied to the fluid within the tube.

On application of the testing pressure, the tail stock body 17 is, by virtue of the forces imposed thereon, caused to pivot about pins 37 to compress springs 28 and come to rest upon frame 11 so that the forces are transferred directly to the frame rather than being transmitted thereto through the carriage 15. As soon as the test is completed, the pressure is cut off, the tube released from between the head and tail stocks and inclined platform 48 moved upward automatically to unclamp the tube. The upwardly moving platform lifts the tube from the rollers and, due to its inclined surface, causes the tube to be ejected from the apparatus and to one side thereof.

In accordance with the provisions of the patent statutes, I have explained the principle and operation of my invention and have illustrated and described what I consider to represent the best embodiment thereof. However, I desire to have it understood that within the scope of the appended claims the invention may be practiced

I claim:

1. Tube testing apparatus comprising a frame, a head stock affixed thereto, a longitudinally movable carriage positioned on said frame, a tail stock body having a passageway therein supported on said carriage and extending transversely across said frame, purging means connected to said tail stock body, a sealing head secured to said tail stock body and communicating with said purging means, means for securing said carriage to said frame, yieldable means interposed between said tail stock body and said carriage normally urging said tail stock body out of contact with said frame, releasable clamping means mounted upon and longitudinally movable with respect to said frame comprising a pair of jaws, separate supports for each of said jaws, means for adjusting said jaws toward and away from each other transversely of said frame, a pair of arms affixed to said supports and pivotally secured to said carriage, means adapted to engage with said arms for causing said jaws to come into clamping relationship with a tube positioned therebetween, means for applying fluid under pressure to said tube being tested, a pair of links connecting said tail stock body to said carriage for permitting said body to swing downward in opposition to said yieldable means and come to rest on said frame for transferring forces thereto incident to testing said tube, means for ejecting said tube from said apparatus on completion of the test thereof, and means for actuating said last mentioned means.

2. In combination with tube testing apparatus having a longitudinally extending frame with a head stock affixed thereto, a tail stock assembly comprising a carriage supported by said frame, driving means secured to and adapted to move said carriage along said frame, a plurality of springs secured to the top of said carriage, a tail stock body, having a passage therethrough, spanning said frame in a transverse direction and yieldably supported upon said springs, tube purging means connected to and at one end of said passage of said tail stock body, means for applying fluid under pressure to said tube being tested, a sealing member secured to and at the other end of said passage of said tail stock body, and a pair of links connecting said tail stock body to said carriage permitting downward movement of said body relative to said carriage when a tube is being tested whereby said body will rest upon said frame for transferring forces thereto incident to the testing of a tube.

3. In combination with tube testing apparatus having a longitudinally extending frame with a head stock affixed thereto, a tail stock assembly comprising a carriage supported by said frame, driving means secured to and adapted to move said carriage along said frame, a plurality of springs secured to the top of said carriage, a tail stock body, having a passage therethrough, spanning said frame in a transverse direction and yieldably supported upon said springs, tube purging means connected to and at one end of said passage of said tail stock body, means for applying fluid under pressure to said tube being tested, a pair of links connecting said tail stock body to said carriage permitting downward movement of said body relative to said carriage when a tube is being tested whereby said body will rest upon said frame for transferring forces thereto incident to the testing of a tube and a vertically adjustable tube support longitudinally movable along said frame to insure alignment of the axis of the tube with the axis of said tube testing apparatus.

4. In combination with tube testing apparatus having a longitudinally extending frame with a head stock affixed thereto, tube clamping means, a vertically adjustable tube supporting member below said clamping means, said clamping means and said supporting member being mounted upon a carriage longitudinally movable along said frame and a tail stock assembly comprising a carriage supported by said frame, driving means secured to and adapted to move said carriage along said frame, a plurality of springs secured to the top of said carriage, a tail stock body, having a passage therethrough, spanning said frame in a transverse direction and yieldably supported upon said springs, tube purging means connected to and at one end of said passage of said tail stock body, a sealing member secured to and at the other end of said passage of said tail stock body, means for applying fluid under pressure to said tube being tested and a pair of links connecting said tail stock body to said carriage permitting downward movement of said body relative to said carriage when a tube is being tested whereby said body will rest upon said frame for transferring forces thereto incident to the testing of a tube.

HERMAN E. GRAU.

REFERENCES CITED

The following references are of record in the file of this patent:

UNITED STATES PATENTS

| Number | Name | Date |
|---|---|---|
| 1,613,150 | Zore | Jan. 4, 1927 |
| 1,841,974 | Naylor | Jan. 19, 1932 |
| 1,972,630 | Neale et al. | Sept. 4, 1934 |
| 2,183,974 | Richardson | Dec. 19, 1939 |
| 2,196,317 | Longstreet | Apr. 9, 1940 |
| 2,293,471 | Protin | Aug. 18, 1942 |